April 11, 1939. F. TIDSWELL 2,153,948
WEIGHING MACHINE
Filed Sept. 8, 1936 2 Sheets—Sheet 1
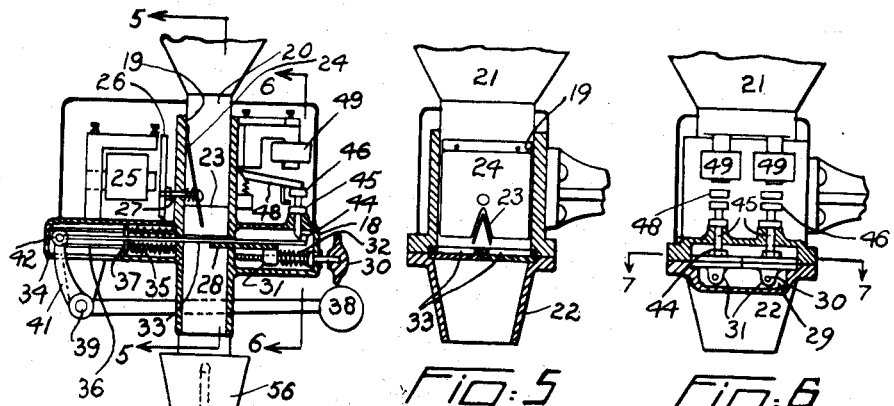
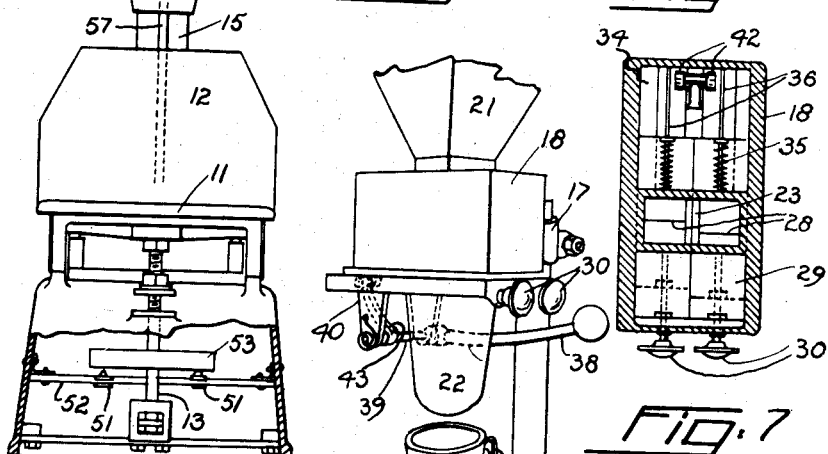
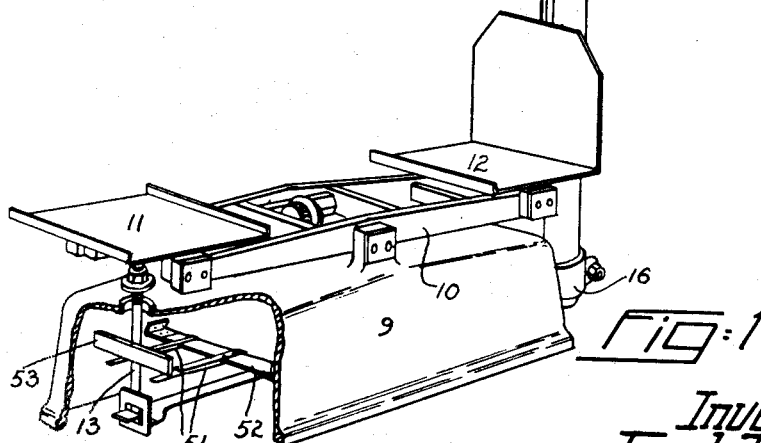
Inventor
Frank Tidswell
BY Fetherstonhaugh & Co.
His Attys.

April 11, 1939.   F. TIDSWELL   2,153,948
WEIGHING MACHINE
Filed Sept. 8, 1936   2 Sheets-Sheet 2
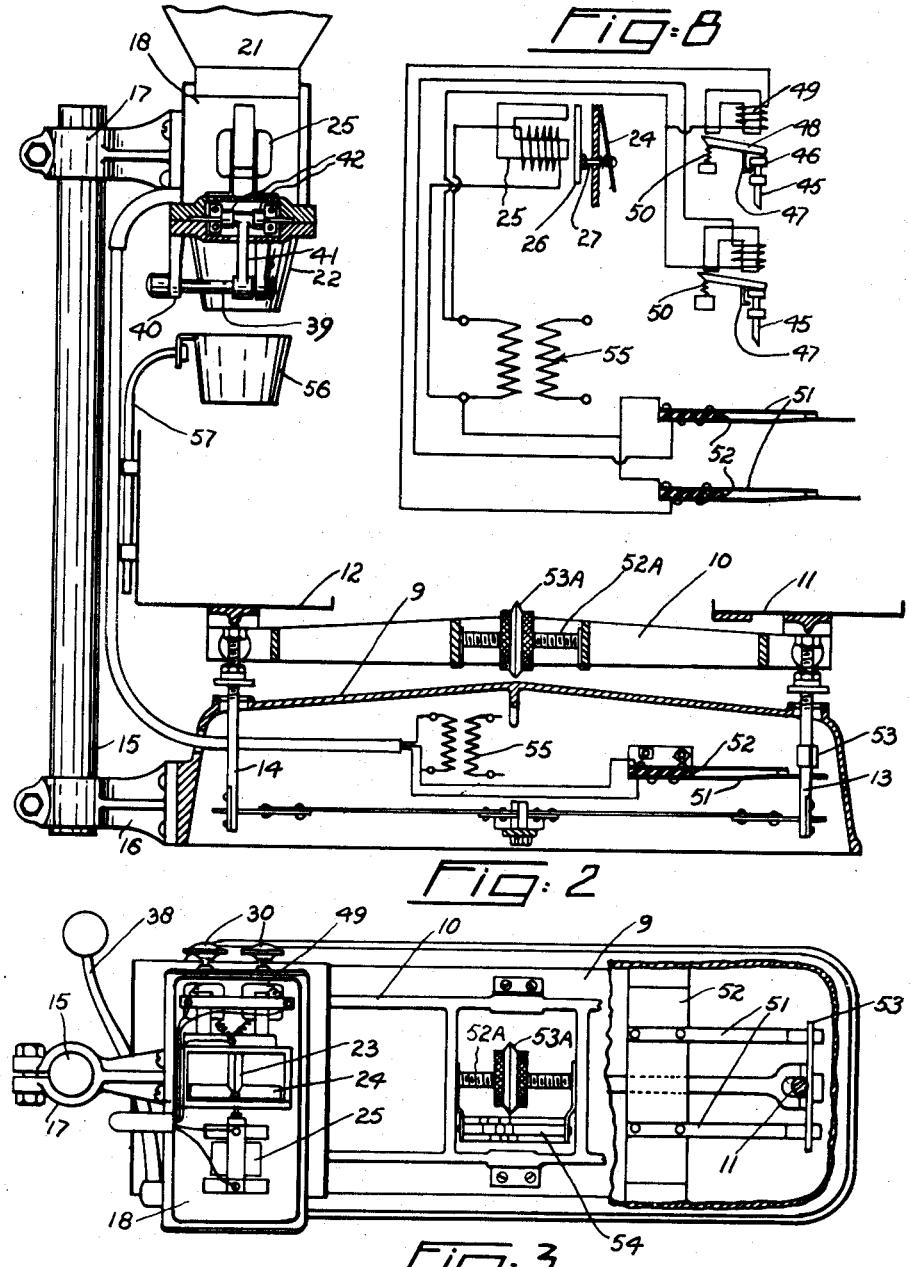

Patented Apr. 11, 1939

2,153,948

UNITED STATES PATENT OFFICE 2,153,948

WEIGHING MACHINE

Frank Tidswell, Goulburn, New South Wales, Australia

Application September 8, 1936, Serial No. 99,831
In Australia September 13, 1935

4 Claims. (Cl. 249—63)

This invention has been specially devised to provide an improved machine for weighing either dry material, as sugar, salt and the like or liquid, which when started allows a flow of such material from a hopper or other container into a bag or other receptacle, until it contains the desired weight, whereupon the flow is automatically cut off. The machine ensures delivery of accurate weight, is fast in operation, can be adjusted within fine limits and is specially suited for grocery requirements where large quantities of sugar or other materials are required to be weighed, although it may be used for other purposes.

This improved weighing machine comprises a suitable frame or stand supporting a hopper or other supply container, a scale or weighing device adapted to carry at one end a bag or other receiving receptacle to be filled with the material being weighed, a supply passage from the hopper or the like, preferably with means for regulating the area thereof, means in said supply passage whereby the stream of flowing material is divided into two individual streams, gate devices for controlling each individual stream and for cutting off same as the desired measure by weight is reached, one acting in advance of the other, means in the said supply passage for agitating or otherwise keeping the flowing stream in motion and preventing packing, and devices for adjusting the balance of the scale or weighing device to compensate for the quantity of material in suspense between the gate devices and a bag or other receiving receptacle after the said supply passage is closed against discharge.

The operation of the gate devices is brought about by contacts disposed upon the scale or weighing device adapted to be closed as the scale pan or the like upon which the bag or other receiver is positioned drops, and thus energizing electro-magnet devices and causing the said gate devices to be closed, one in advance of the other.

In some constructions a guide device or holder may be embodied in the scale pan to hold the mouth of a bag open.

In order to more fully describe this invention, reference will be had to the drawings accompanying and forming part of this complete specification, such drawings being more or less diagrammatic and wherein:—

Fig. 1 is a perspective partly in section showing a preferred construction of the improved weighing machine, and Fig. 2 is a longitudinal sectional elevation of same, Fig. 3 a sectional plan with the hopper removed,
Fig. 4 is a sectional end elevation,
Fig. 5 a section on line 5—5 in Fig. 4, and
Fig. 6 a section on line 6—6 in Fig. 4, and
Fig. 7 a section on line 7—7 in Fig. 6, and
Fig. 8 is a diagram of the electrical circuits.

The improved machine consists of a weighing scale or the like of any suitable form that shown in the drawings consisting of a base housing 9 having a balance arm frame 10 pivoted thereupon and carrying pan members 11 and 12 under which are stem rods 13 and 14 connected and arranged as usual and all of which parts are more or less as ordinary.

At one end of the base housing 9 a vertical column 15 is affixed in place in a divided boss bracket 16 and has slidably adjustably mounted upon its upper end a bracket 17 affixed to and carrying casing 18 in which the supply, measuring and control apparatus is arranged.

About centrally of the casing 18 a rectangular passage 19 is provided therethrough in the top end of which the mouth 20 of a supply hopper 21 fits; this supply hopper 21 may be of any suitable form adapted to hold a convenient quantity of material say sugar, salt or the like. The lower end of the passage 19 is formed as a sidewardly tapered discharge mouth 22, and at a point approximately medially of its length there is a mid-dividing ridge 23 arranged transversely thereacross, being of triangular cross section, the apex of which is directed to the top, and dividing the supply stream into two streams.

Above the dividing ridge 23 a vibrating diaphragm 24 is arranged in the passage 19, operated by a trembler coil 25 housed in the casing 18 and connected from the armature 26 by arm 27 with extruding spring on the outer end thereof; the trembler coil 25 is suitably connected up with the electric supply circuit.

Below the dividing ridge 23 the passage 19 has its area regulated to adjust the volume of flow per unit of time by means of a pair of side by side horizontally arranged transverse slides or shutters, 28, which slide through guide slots in the passage sidewall from housing 29 at one side and are each independently controlled by a separate lead screw 30 engaging a nut 31 on one end of the underside of each said slide 28 and having the outer ends shaped as convenient hand knobs. A helical spring 32 is arranged upon each lead screw 30 to adjust any slackness to prevent uncontrolled variation of the opening of the slides 28.

Above the area adjusting slides 28 and under the ridge 23 a pair of flow control gates 33 are slidable in guides horizontally of and transversely of the passage 19 and extend from a side housing 34 across said passage 19 to the housing 29, and each said gate 33 has a slot therein and is adapted to control one portion of the said passage 19 adjacent the ridge 23, that is each of the streams caused by said ridge 23. The gates 33 are adapted to be normally closed by means of springs 35 on rods 36 in housing 34 which springs 35 abut a cross bracket 37 on one end of said gates 33, so causing the latter to be drawn to the shut position protruding into the said housing 34. These gates 33 are adapted to be manually opened to start the streams flowing by means of a hand lever 38 connected to a shaft 39 in bearings 40 from the casing 18 and a crank 41 has rollers 42 mounted thereupon on either side to abut the inner end of each said gate 33 to push same to open position as the hand lever 38 is depressed at its ball end. This hand lever 38 is adapted to be depressed against an end coiled spring 43 (see Figs. 1 and 2) which returns it to normal more or less horizontal position when released. To keep the gates 33 open while the streams are flowing a head projection or tongue 44 is provided at the outer end of each said slide 33 behind which locks a check pin 45 with bearing in the top wall of housing 29, and having a projection 46 on the upper end engaging with a projection 47 from an armature 48 of an electro-magnet 49, such armature 48 having an end spring 50 whereby it is normally depressed at one end to thrust the mentioned check pin 45 into engagement when the electro-magnet is inoperative.

To release the check pins 45 and allow the gates 33 to close, that is when the desired quantity of material has been allowed to flow therethrough a pair of contacts 51 are arranged in the base housing 9 on cross bars 52 adapted to be allowed to close when a pressure bar 53 upon the stem 13 is moved therefrom as the pan member 11 carrying the weight or weights rises, as the pan 12 with the bag or other receiver is depressed and so the circuit to the electro-magnet 49 is closed and the check pins 45 lifted and allowing the gates 33 to close.

In order to effect close adjustment as the final weight is approached, one slide 33 is closed before the other and this is done by having one of the contacts 51 arranged in advance of the other so that one electro-magnet 49 operates before the other and thus a fine adjusting stream of material is permitted for bringing up the required measure and obviating any undesirable sudden movements of the scale.

To compensate the scale to suit different materials and to adjust for the quantity of material in suspense between the gates 33 and the bag or receiver after such gates are closed a screw rod 52A is arranged medially of the scale balance arm frame 10 (see Fig. 3) and has a weighted adjusting nut 53A mounted thereupon, adapted to be traversed therealong to either side of the centre of balance. This adjusting nut 53A preferably has a V-shaped edge adapted to be set to an index scale 54 arranged adjacent the rod 52A and suitably inscribed to provide easy settings to compensate for different weights of materials in discharge suspense after gate closure.

In order to obviate sparking at contacts and other disadvantages from the use of a high voltage current as the usual 240 volt alternating current supply system, a transformer indicated at 55 may be positioned in the electric circuit and housed in the base of the machine, adapted to transform the current down to a suitable extent say 4 or 6 volts. The parts are wired together according to established electrical practice as well understood.

The guide device for holding the mouth of a bag or the like open may consist of a tapered sleeve 56 adapted to fit in the said mouth and mounted upon a rod 57 slidably adjustably clipped to the back of the pan 12.

In operation to weigh material say sugar, the slides 28 being previously adjusted to regulate the volume of flow per unit of time, by intruding or retiring them from the passage 19 by the lead screws 30, the sugar being placed in the hopper 21, a suitable weight placed on the pan 11, a paper bag on pan 12, and the adjusting nut 53A set to the desired setting. Now the current being switched on the hand lever 38 is depressed causing its rollers 42 to abut the ends of the gates 33 sliding them open and traversing their outer ends over towards the other side, the tongues 44 being engaged by the check pins 45 and said gates 33 being held open.

The flowing stream kept from packing by the vibrating diaphragm 24, is divided by the ridge 23 and flows in two sections through the discharge mouth 22 into the bag and as the pan 11 tips and the required weight is approached one contact 51 is closed by the pressure bar 53 moving therefrom thus energizing the respective electro-magnet 49 withdrawing the check pin 45, and allowing its gate 33 to close.

Now the stream is comparatively fine and quickly and gently adjusts to the desired weight which when reached closes the second contact 51 and shuts the other gate 33. The bag with the correct weight of material is removed and another filled and so the operation continues.

It is to be understood that although only one form of the invention has been illustrated, it is not limited thereto but may be modified in different ways to suit various requirements without departing from the spirit of the invention.

I claim:

1. A weighing machine comprising a suitable frame supporting a supply container, a scale adapted to carry a receiving receptacle to be filled with the material being weighed, a supply passage from said supply container to a point of discharge adjacent said receiving receptacle, means in said supply passage for dividing the flowing stream of material into two individual streams, means in said passage for adjusting the area thereof, gate devices for controlling each individual flow stream and for cutting same off as the desired measure by weight is reached, one said gate device being adapted to close in advance of the other, means for opening the said gate devices for starting the flow of material, electromagnetic devices for retaining said gate devices open and for releasing same to close, electrical contact devices adapted by the tipping of the scale device to operate said electro-magnetic devices for closure of said gate devices one in advance of the other, as and for the purposes herein set forth.

2. A weighing machine as defined in claim 1, in which the supply of the material in two stream sections is controlled by a pair of gates, one for each stream section, said gates being arranged in side by side relationship slidable transversely across the supply passage, spring devices arranged at one side of each gate to normally close same, catch means provided at another side of said gate engaging when said gate is opened with a locking device connected to the armature of an electro-magnet adapted when energized to release the said locking device from engagement with the catch device and allow the said spring devices to close said gate, and an operating lever pivoted upon the machine and connecting to one end of the two gates to manually slide same open.

3. A weighing machine as defined in claim 1, in which the gates and the volume control slides are each arranged in side by side pairs each pair being parallel with the other and disposed under the dividing means in the supply passage.

4. A weighing machine as defined in claim 1 in which the supply of the material in two stream sections is controlled by a pair of gates, one for each stream section, said gates being arranged in side by side relationship slidable transversely across the supply passage, spring devices arranged at one side of each gate to normally close the same, catch means provided at another side of said gate engaging when said gate is opened with a locking device connected to the armature of an electro-magnet adapted when energized to release the said locking device for engagement with the catch device and allow the said spring device to close the gate and a manually operating lever pivoted upon the machine for opening the gates, said lever having a cranked end with rollers disposed at each side of the outer end thereof, each adapted to contact one end of the gate and a spring device associated with said lever for returning it to normal "ready" position after the said slides have been opened.

FRANK TIDSWELL.